United States Patent [19]

Han et al.

[11] Patent Number: 5,724,610
[45] Date of Patent: Mar. 3, 1998

[54] SELECTOR BANK SUBSYSTEM OF CDMA SYSTEM USING A PAIR OF FIRST PROCESSORS FOR SELECTING CHANNELS BETWEEN CDMA INTERCONNECT SUBSYSTEM AND MOBILE SERVICE SWITCH CENTER

[75] Inventors: Jin Soo Han, Daejeon; Yoon Chae Cheong, Kyoungki-do, both of Rep. of Korea

[73] Assignee: Hyundai Electronics Industries Co., Ltd., Kyoungki-do, Rep. of Korea

[21] Appl. No.: 478,030

[22] Filed: Jun. 7, 1995

[30] Foreign Application Priority Data

Jun. 30, 1994 [KR] Rep. of Korea ............... 94-15638

[51] Int. Cl.$^6$ ............................................ G06F 13/00
[52] U.S. Cl. .................... 395/842; 395/858; 370/320; 370/431; 370/441
[58] Field of Search ............... 370/58.2, 50, 62, 370/31, 320, 431, 441; 375/7, 1; 395/307; 455/11.1

[56] References Cited

U.S. PATENT DOCUMENTS

| | | | |
|---|---|---|---|
| 4,268,722 | 5/1981 | Little et al. | 370/62 |
| 4,514,808 | 4/1985 | Murayama et al. | 395/307 |
| 5,117,501 | 5/1992 | Childress et al. | 455/11.1 |
| 5,297,162 | 3/1994 | Lee et al. | 375/1 |
| 5,319,634 | 6/1994 | Bartholomew et al. | 370/441 |
| 5,329,550 | 7/1994 | Rousseau et al. | 375/7 |
| 5,506,837 | 4/1996 | Sollner et al. | 370/31 |
| 5,546,383 | 8/1996 | Cooley et al. | 370/50 |
| 5,568,490 | 10/1996 | McNinch et al. | 370/58.2 |

*Primary Examiner*—Thomas C. Lee
*Assistant Examiner*—Le Hien Luu
*Attorney, Agent, or Firm*—Merchant, Gould, Smith, Edell, Welter & Schmidt

[57] ABSTRACT

A selector bank subsystem (SBS) of a code division multiple access (CDMA) system is disclosed, including two portions: a SBSC block and a S/V block. The one SBSC block is designed to manage twelve S/V boards so as to provide 96 traffic channels per SBS self, and thus, one S/V board provides eight communication channels. A selector bank subsystem (SBS) of a code division multiple access (CDMA) system, includes: an SBS block, the SBS block being composed of a pair of first processors for controlling the traffic frame communication with a CDMA interconnect subsystem (CIS) by selecting a channel between the CIS and a mobile service switch center (MSC); a dual port RAM (DRAM) for storing the traffic frame by the control of the first processor and being access-controlled by direct memory access controller (DMAC); a second processor for controlling the DMAC; an E1 interface portion for interfacing the frame data with the MSC by receiving synchronism from the TFU of the CPS receiver; and a S/V block being linked between the DRAM and the E1 interface as a plurality of extensible card forms, and for receiving the traffic frame to the E1 interface portion after DSP-processing. Therefore, the subsystem completes the SBS constitution of a mass-production module having competitiveness, avoids a complicated hardware constitution and reduces the possibility of a signal conflict between boards.

2 Claims, 4 Drawing Sheets

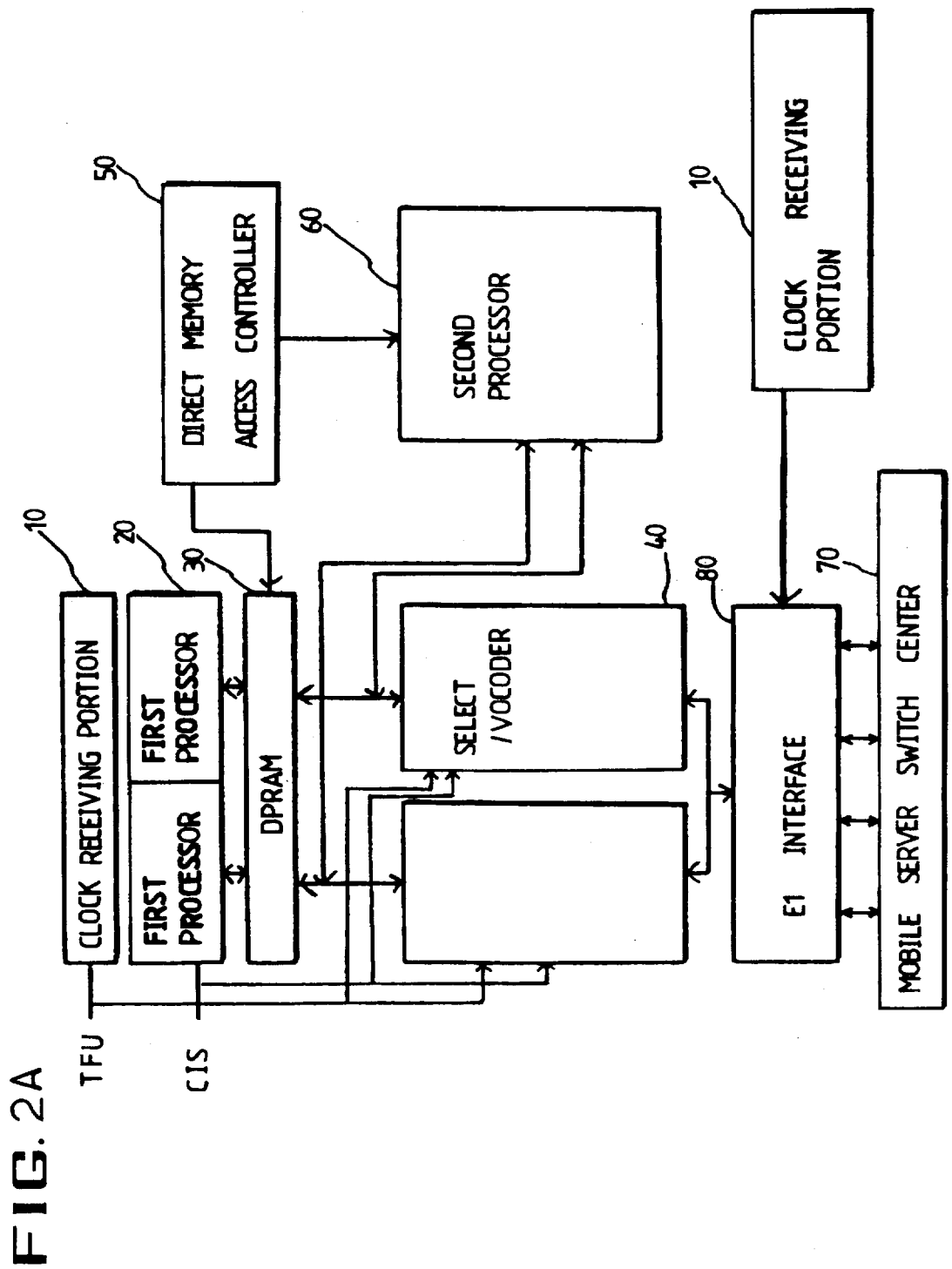

SELECTOR BANK SUBSYSTEM OF CDMA SYSTEM USING A PAIR OF FIRST PROCESSORS FOR SELECTING CHANNELS BETWEEN CDMA INTERCONNECT SUBSYSTEM AND MOBILE SERVICE SWITCH CENTER

BACKGROUND OF THE INVENTION

The present invention relates to a selector bank subsystem (hereinafter called SBS), which is a subsystem in a code division multiple access (CDMA) base station controller for controlling the process before a signal is connected to a CDMA switcher during the transmit-receive process of the content to be communicated by a user through a CDMA terminal with CDMA base transceiver subsystem, among a wireless communication apparatuses in a CDMA method for serving vocal or data, and more particularly to a selector bank subsystem controller (SBSC) block and a selector/vocoder (S/V) block, the one SBSC block being designed to manage twelve S/V boards so as to provide 96 traffic channels per SBS self, and thus, one S/V board providing eight communication channels.

Generally, an SBS provides a 64 KBPS (Bit Per Second) pulse code modulation data channel to a switcher by decoding a voice signal transmitted via a base transceiver subsystem (BTS), and reversely, generates a frame of a msec-unit by encoding the 64 KBPS pulse code modulation (PCM) data and provides the frame to the BTS. As an important function, the SBS also performs the selection of the same terminal traffic data received from two BTS by supervising the process of a call in a soft handoff.

The three typical known structures among the SBS structures of currently developing CDMA systems will now be compared with one another and explained to point out problems briefly.

FIG. 1A shows the structure of a system in which a select common interface (SCI) board and a S/V board are connected by point-to-point. Referring to FIG. 1A, the problem of the SBS structure of CDMA is that a selector common interface (hereinafter called SCI) board and a S/V board in the circuit are connected by point-to-point so that the number of S/V board connections are restricted by the number of SCI connection pins. That is, a single self can hold only 10 S/V boards (one rack has 4 selves, so, 40 S/V boards per rack), thereby communication channels are provided to the SBS.

FIG. 1B shows the structure of the system where SBSC is connected to a S/V board by bus as another example, and the CDMA SBS structure of FIG. 1B is a much improved form comparing with that of FIG. 1A. As shown in the drawing, SBSC is connected with a S/V board by bus, which solves the problem of the structure of FIG. 1A and channel capacity is increased to 96 channels per self.

This results from the fact that a single S/V board is integrated to hold 8 communication channels (12*8=96).

However, the CDMA SBS structure of FIG. 1B has a problem of being designed as a complicated hardware, such as bus arbitration and interrupt, at a bus-connection portion.

FIG. 1C shows the structure of a form in which a mobile switch center interface (MSCIF) and a SBSC are integrated. The CDMA SBS structure of FIG. 1C comprises a selector function and a new SBS controller by integrating the MSCIF and the SBSC of FIG. 1A and, thus, is composed of four vocoder circuits having a capacity of 15 channels.

An E1 link is a European or medium speed link, that is, the signal is composed of 32 time slots of 64 kpbs. Here, if a SBS and CDMA switcher is connected to two E1 links, 60 E1 slots can be allocated at a traffic channel. Thus, four vocoders (4*15=60 channels) and one SBS controller constitutes one module, so that one module holds 60 channels. Accordingly, the CDMA SBS structure of FIG. 1C is designed by separating a selector module and a vocoder module, and a selector function excluding vocoder algorithm is mounted on the SBS controller which is profitable in hardware integration. However, there is an over-load problem in hardware in processing 60 vocoders in the SBS controller and also a management problem of operation in software.

On the other hand, a telephone extension system technic is disclosed in U.S. Pat. No. 5,319,634. The technic is related to the telephone line extension within a building, by which secret coding is possible to not allow access which is not ordered. Concurrent multiple conversations are possible via closely combined same transmission mediums by compounding multiple access technic selected among time, code and frequency divisions. However, in utilizing industrially the above technic, there is practical trouble because the compounding technic is not perfect.

SUMMARY OF THE INVENTION

To solve the above problems, it is an object of the present invention to provide a selector bank subsystem (SBS) structure and method of a code division multiple access (CDMA) system, which is composed of two portions: a SBSC block and a S/V block. The one SBSC block is designed to manage twelve S/V boards so as to provide 96 traffic channels per SBS self, and thus, one S/V board provides eight communication channels.

Accordingly, to achieve the above object, there is provided a selector bank subsystem (SBS) of a code division multiple access (CDMA) system, including: a SBS block, the SBS block being composed of a pair of first processors for controlling the traffic frame communication with a CDMA interconnect subsystem (CIS) by selecting a channel between the CIS and a mobile service switch center (MSC); a dual port RAM (DRAM) for storing the traffic frame by the control of the first processor and being access-controlled by direct memory access controller (DMAC); a second processor for controlling the DMAC; an E1 interface portion for interfacing the frame data with the MSC by receiving synchronism from the timing frequency unit (TFU) of the global positioning signal (GPS) receiver; and a S/V block being linked between the DRAM and the E1 interface as a plurality of extensible card forms, and for receiving the traffic frame to the E1 interface portion after digital signal processing (DSP).

To achieve the above object, there is provided a data transmitting method of the selector bank subsystem (SBS) of a code division multiple access (CDMA) system, including the steps of: transmitting-receiving traffic frames passed in and out through a selector common interface with a dual port controlled by a first processor in the SBSC; transmitting the data in dual port RAM by using DMAC to a selector/vocoder board in a first-in-first-out structure by a second processor; transmitting-receiving the data to and from a DSP module by a DSP transmit controller (TX) and receive controller (RX) interrupt signals of an interrupt controller in time with a precise transmitting time, after the traffic frames passed in and out of SBSC are analyzed solely in the CPU of a microprocessor and temporarily moved and stored in an SRAM.

BRIEF DESCRIPTION OF THE DRAWINGS

The above objects and advantages of the present invention will become more apparent by describing in detail a preferred embodiment thereof with reference to the attached drawings in which:

FIG. 2A is a block diagram illustrating the SBSC of the present invention; and

DETAILED DESCRIPTION OF THE INVENTION

Figure 1A:
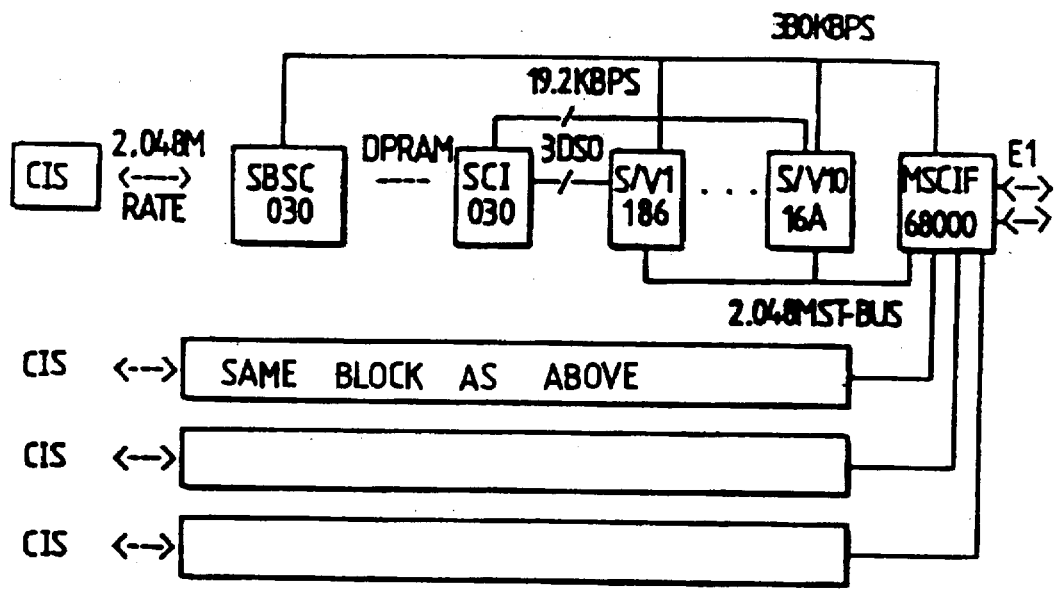
FIG. 1A is a block diagram illustrating the SBS constitution of the CDMA system of the prior art in which the SCI board and the S/V board are connected in point-to-point.
Figure 1B:
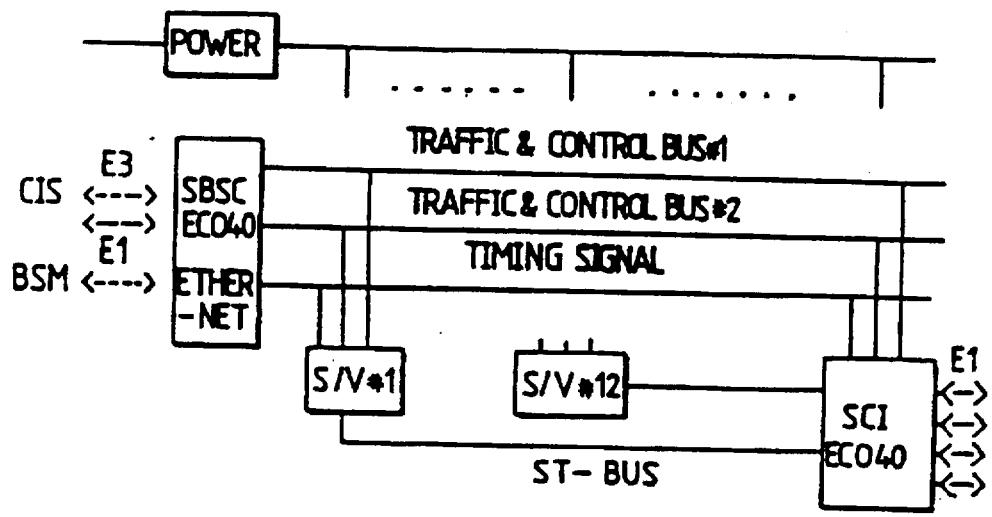
FIG. 1B is a block diagram illustrating the SBS constitution of the CDMA system of the prior art in which the SBSC is connected in bus to the S/V board.
Figure 1C:
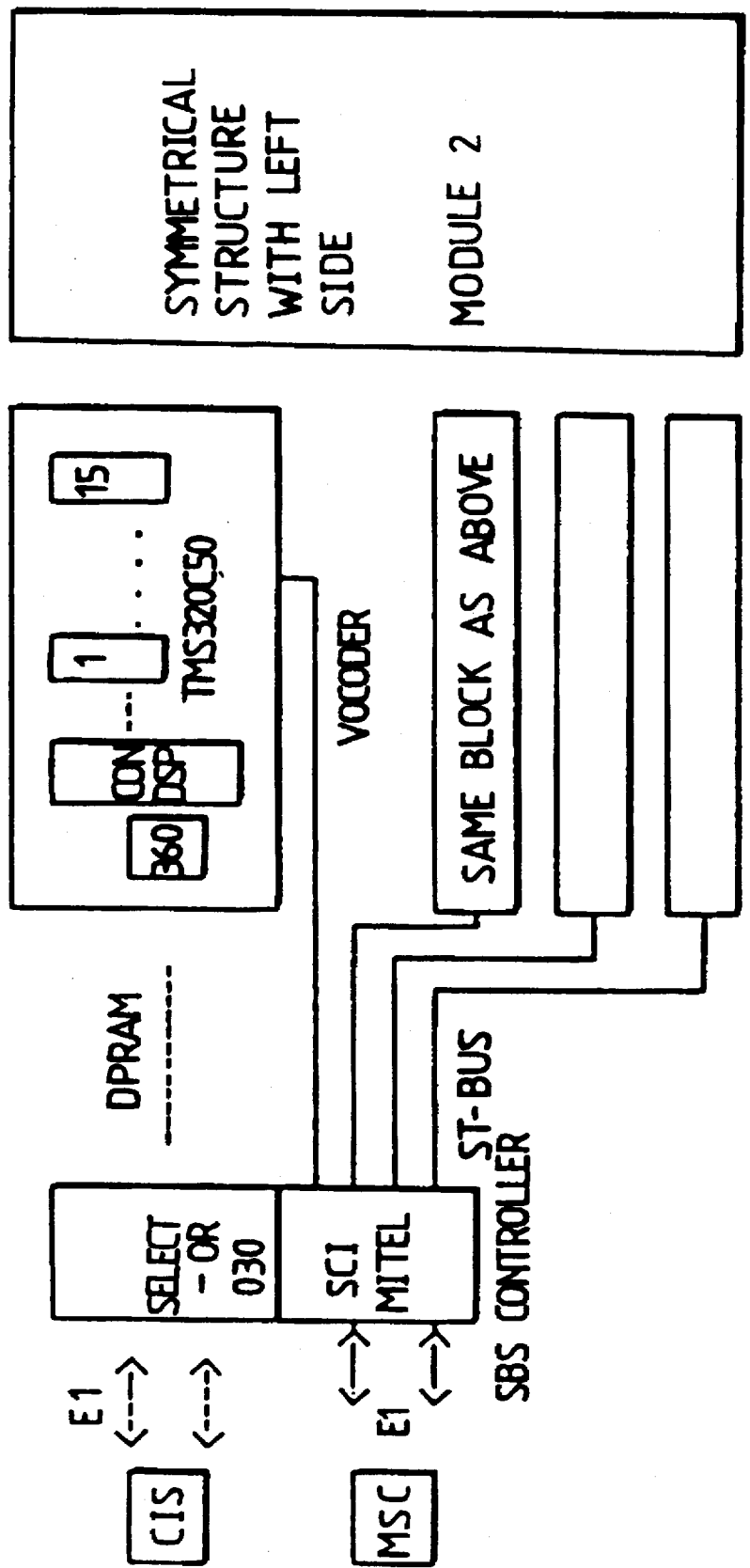
FIG. 1C is a block diagram illustrating the SBS constitution of the CDMA system of the prior art in which the SBSC is connected in bus to the CDMA system of the prior art in which the MSCIF and the SBSC are integrated.
Figure 2B:
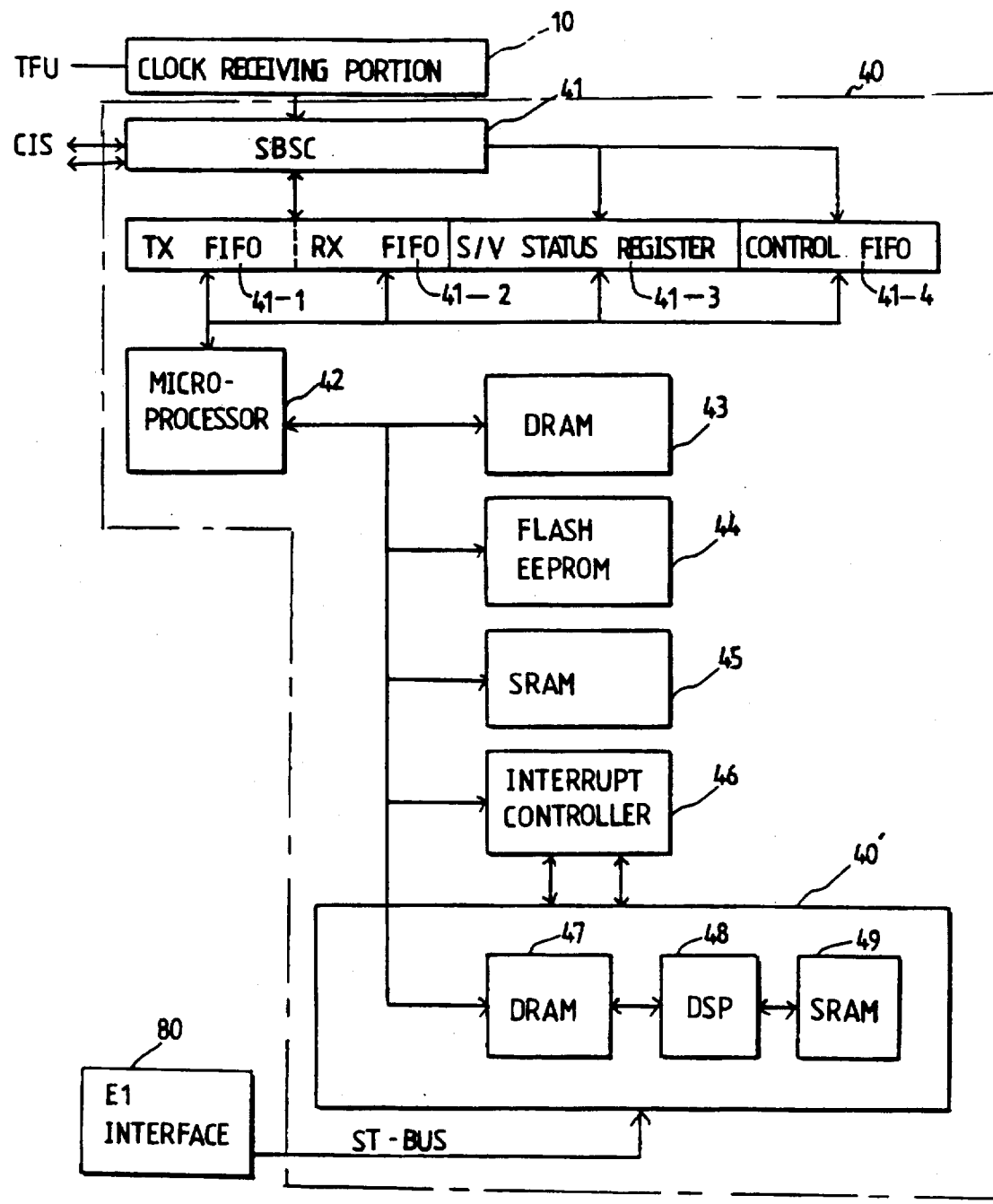
FIG. 2B is a block diagram illustrating the S/V of the present invention.

The SBSC block of the present invention is illustrated as in FIGS. 2A and 2B. In the drawings, SBS consists of a SBSC block and a S/V block. The SBS block is composed of a pair of first processors 20 for controlling the traffic frame communication with a CDMA interconnect subsystem (CIS) by selecting a channel between the CIS and a mobile service switch center (MSC) 70; dual port RAM (DPRAM) 30 for storing the traffic frame by the control of the first processor 20 and access-controlled by direct memory access controller (DMAC) 50; second processor 60 for controlling DMAC 50; E1 interface portion 80 for interfacing the frame data with MSC 70 by receiving synchronism from TFU of the CPS receiver.

The S/N 40 block is linked between DPRAM 30 and E1 interface 80 as a plurality of extensible cards form, and for receiving a traffic frame to E1 interface portion 80 after DSP processing.

In the SBSC block of FIG. 2A, traffic frames which passed in and out through CIS are arbitrarily controlled by a pair of first processors 20, and the data of DPRAM 30 is transmitted to S/V board 40 by a second processor 60 through a First-In-First-Out (FIFO) structure by using DMAC 50. Here, E1 interface portion 80 means trunk connection for connecting with a CDMA switcher, and of which clocks are a synchronous signal input to clock receiving portion 10 via a global positioning signal (GPS) receiver and a TFU so as to constitute a phase locked loop. Also, two E1 links (or medium speed links) are connected to CIS on a single SBSC, and three or four E1 links are connected to switcher 70.

As an important performance in this constitution, by calculating maximum processing delay resulted from the processing of packet with S/V by SBSC, processing delay and tentative standard time 2 msec are compared.

When the second processor 60 of SBSC performs direct memory access with DMAC at a fast transfer rate, 5 MB is processed per second, so that the processing time when one packet is 44 byte, is 8.8 μs and the maximum input packet number to SBSC per msec is 384 (96 ch*4) packets in 100% handoff. Considering direct memory access operation overhead 60 CPU clock=3.636 μsec, one-packet processing time is 8.8+3.636=12.436 μs and when 384 packets, 12.436*384= 4.775 ms.

Thus, the worst case packet processing delay becomes 4.775 msec disregarding packet input time, however, when a staggered frame is used, such a case cannot actually occur.

By setting on basis of IS-95 for the convenience, using 2.5 msec staggered frame being double the 1.25 msec results in the processing delay of 4.775/8=0.6 msec, and when the packet is input to SBSC from the S/V, in which the same assumption is possible, TX and RX interrupts occur concurrently and the worst case packet processing delay becomes the same result as above.

On the other hand, time ratio consumed for delivery of packet transmit-receive by CPU during msec is 477.5/20= 23.87. So, 76% can be used for software operation peculiar to a selector. Further, when interrupt occurrence or processing portion is not stable, packet is missing, thus, the portion is designed to a hardware.

The S/V block of FIG. 2B receives a synchronous signal from timing and frequency unit (TFU) and is linked to switcher 70 in three or four trunks through E1 interface 80. SBSC 41 connects TX FIFO 40-1, RX FIFO 41-2, S/V status register 41-3 and control FIFO 41-4, and also, is linked to microprocessor 42, so that the S/V block can communicate by using digital signal processing (DSP) module 40' and DPRAM 30. In the constitution of the S/N block, the data of DPRAM 30 is transmitted by providing an interrupt signal by DSP 40' and microprocessor 42 module has a selector function. One S/V board 40 is composed of eight DSP modules 40' and each DSP module 40' includes SRAM 49, DSP 48 and DPRAM 47. Each DSP module 40' is connected in ST-BUS so as to be linked with the E1 interface portion 80 of SBSC block.

In the S/V block of FIG. 2B, the traffic frames passed in and out of SBSC 41 are analyzed solely in the central processing unit (CPU) of microprocessor 42 and temporarily mounted and stored in SRAM 45, and then data is transmitted/received to and from DSP module 40' by the DSP TX and RX interrupt signals of interrupt controller 46 in time with a precise transmitting time.

The code to download DSP module 40' program on high speed SRAM by CPU during board initialization, is stored on the flash EEPROM 44. DRAM 43 is a dynamic memory for uploading operation system. The processing method of an interrupt is that each DSP module 40' generates TX and RX interrupt signal at every msec and these interrupt states are saved by a 8-bit register (Flip-Flop). Each register generates transmit and receive interrupt lines (TX IRQ and RX IRQ) on a processor, and a processor module reads the content of the register by the interrupt occurrence. After being read, the register clears a state bit and an output interrupt line and maintains the ready state to accept an incoming interrupt. Interrupt controller 46 is composed of two independent transistor transistor logic circuit (TTL) modules for processing TX and RX case, respectively.

As described above, the present invention completes the SBS constitution of a competitive mass-production module by increasing the number of channels being provided per self of one SBS, using a bus type in a traffic data transmitting method between boards for the easy improvement and extension afterward, meanwhile, avoids a complicated hardware constitution such as bus intervention and interrupt by using DPRAM and FIFO, and reduces the possibility of a signal conflict between boards by keeping independence between blocks.

Further, not only a simple hardware constitution, but the compatibility with a conventional software is considered to materialize the software easily. Also, the present invention is designed in an appropriate constitution by calculating power-consuming amount so as to have a merit in utilization following a practical realization and development.

What is claimed is:

1. A selector bank subsystem (SBS) of a code division multiple access (CDMA) system, comprising:

an SBS block, said SBS block being composed of a pair of first processors for controlling a traffic frame communication with a CDMA interconnect subsystem (CIS) by selecting a channel between the CIS and a mobile service switch center (MSC); a dual port RAM DPRAM for storing a traffic frame by the control of the first processors and being access-controlled by a direct memory access controller (DMAC); a second processor for controlling the DMAC; a medium speed link (E1) interface portion for interfacing a frame data with the MSC by receiving synchronism from a timing and frequency unit of a global positioning signal receiver; and a selector/vocoder block being linked between the DPRAM and the E1 interface as a plurality of extensible card forms, and for receiving the traffic frame to the E1 interface portion after digital signal processing.

2. A data transmitting method of a selector bank subsystem (SBS) of a code division multiple access (CDMA) system, comprising the steps of:

transmitting-receiving traffic frames passed in and out through a selector common interface with a dual port RAM controlled by a pair of first processors in a selector bank subsystem controller (SBSC);

transmitting a data in dual port RAM by using a direct memory access controller to a selector/vocoder board in a first-in-first-out structure by a second processor;

transmitting-receiving the data to and from a digital signal processing (DSP) module by a DSP transmit controller and receive controller interrupt signals of interrupt controller in time with a precise transmitting time, after the traffic frames passed in and out of SBSC are analyzed solely in a CPU of a microprocessor and temporarily moved and stored in an SRAM.

* * * * *